March 6, 1951 — J. W. HOLLAND — 2,544,021
FOLDING WING DEVICE
Filed May 3, 1948 — 2 Sheets-Sheet 1
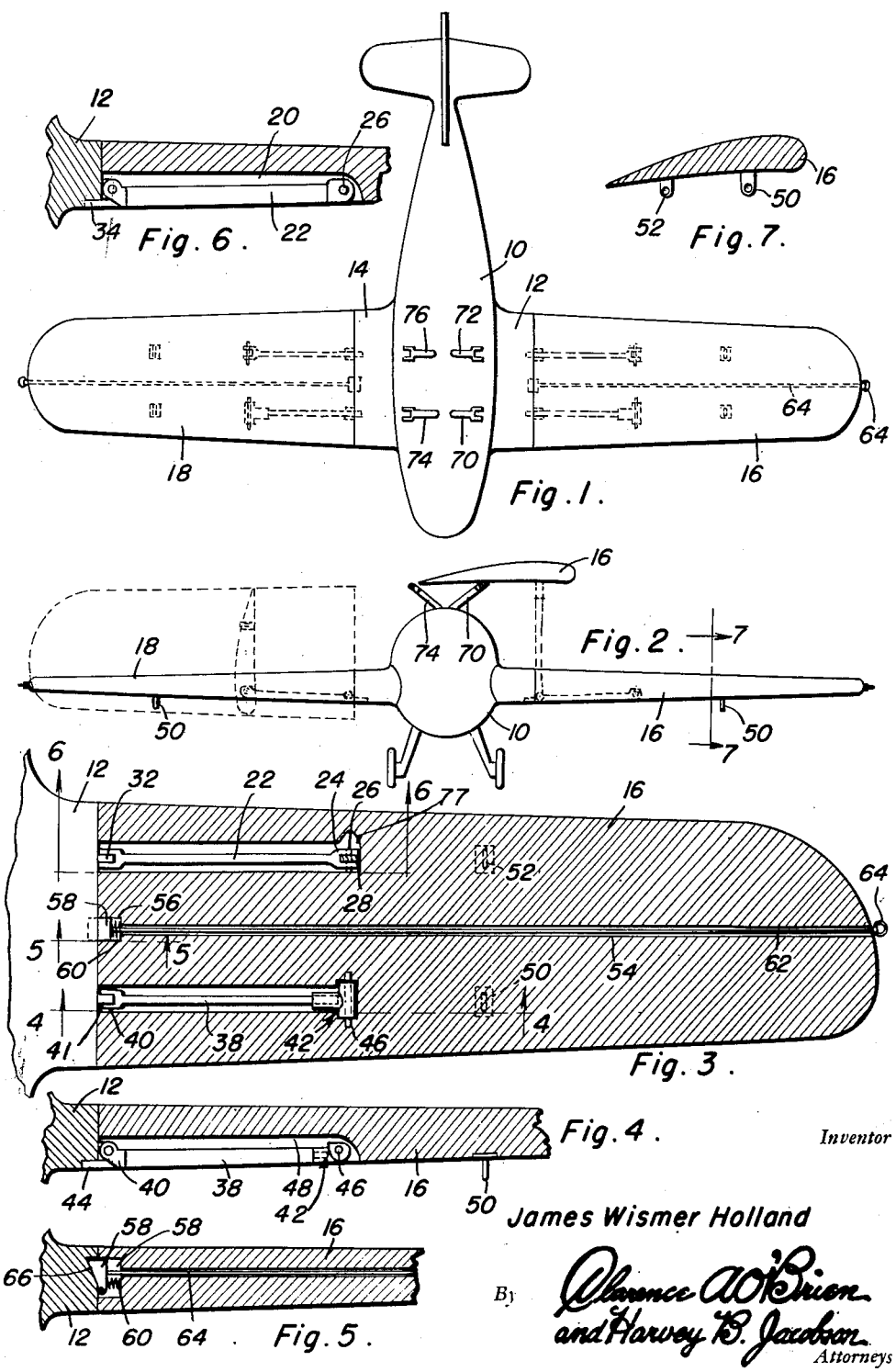
Inventor
James Wismer Holland March 6, 1951

J. W. HOLLAND 2,544,021

FOLDING WING DEVICE

Filed May 3, 1948

Inventor

James Wismer Holland

By Clarence A. O'Brien
and Harvey B. Jacobson
Attorneys

Patented Mar. 6, 1951

2,544,021

UNITED STATES PATENT OFFICE 2,544,021

FOLDING WING DEVICE

James Wismer Holland, Valdosta, Ga.

Application May 3, 1948, Serial No. 24,750

7 Claims. (Cl. 244—49)

This invention relates to novel and useful improvements in devices for folding wings of an aircraft to a position substantially parallel to the fuselage of the aircraft and to a position overlying the top portion of the fuselage.

An object of this invention is to fold the wings of an aircraft in order to make the craft roadable.

Another object of this invention is to partially overlie one of the wings over the other or more specifically, partially overlie one half of the wing of the aircraft over the other half.

Another object of this invention is to swivelly connect each of the wings (one half of the wing of the aircraft considered as an entire wing) in such a manner as to permit the wings to first be rotated then hingedly swung to a position substantially parallel to the axis of the fuselage of the craft.

Another object of this invention is to supply a latch within the wings of the craft operable from the wing tips for maintaining the wings in the extended position.

Another object of this invention is to provide a simplified device of the nature to be described which is both practical and safe in operation.

Ancillary objects and features of novelty will become apparent to those skilled in the art, in following the description of the preferred form of the invention, illustrated in the accompanying drawings, wherein:

Figure 1 is a plan view of an aircraft having the invention associated therewith;

Figure 2 is a front view of the invention shown in Figure 1, showing the device in various operational forms and steps;

Figure 3 is a sectional view of a wing section having the invention applied thereto;

Figure 4 is a sectional view taken substantially on the line 4—4 of Figure 3;

Figure 5 is a sectional view taken on the line 5—5 of Figure 3;

Figure 6 is a sectional view taken substantially on the line 6—6 of Figure 3;

Figure 7 is a sectional view taken substantially on the line 7—7 of Figure 2 and in the direction of the arrows;

Figure 8:
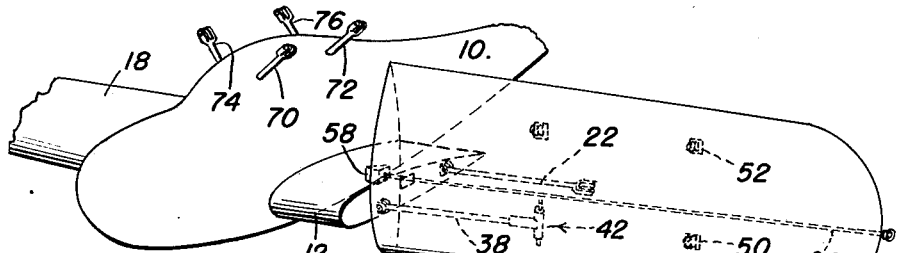
Figure 8 is a perspective view showing operational positions of the preferred form of the invention.

The utility of the present invention permits the operator of the craft to actuate the same down a highway or the like without restricting the operator's vision, without changing materially the aircraft center of gravity and without setting up objectionable frontal area which might be effected by wind. Of course, by utility of the present invention the craft may be utilized in a conventional garage instead of a hanger, whether the invention be used solely for air transportation, or air and road transportation.

The present invention may be folded and unfolded quickly by a single individual and does not materially offset the aerodynamic characteristic of the air foil.

The preferred field of utility of the present invention is in small and light aircraft however, it is within the purview of the present invention to utilize various adaptations of the same for military craft particularly that utilized in carriers or the like.

A substantially conventional fuselage 10 is illustrated with projections 12 and 14 respectively which are actually the root of wings or air foil. As is known in the art both halves or portions of the wings are generally considered as a "wing" however, for descriptive purposes either of the sections 16 or 18 which cooperate to form a single wing will be termed a wing.

The fuselage 10 is of course, supplied with various appurtenances contiguous to aircraft such as the landing gear, empennage and the like. Further, the projections 12 and 14 may be faired.

Each of the wings 16 and 18 are identical in structure therefore, a description of one will lead to a clear understanding of the other. Taking the wing 16 for illustrative purposes and as is seen in Figure 6 a recess 20 is supplied in the lower surface thereof. This recess has a stay rod 22 supplied therein, which stay rod is provided with bifurcated terminals. The bifurcated end 24 is adapted to receive a pin 26 therethrough, which pin also extends through a bracket 28. This bracket 28 is received entirely within the recess 20. The opposite end of the stay rod 22 has its bifurcated end hingedly secured to a plate 32 which is secured to the projection 12. The end 34 of the stay rod 22 is engageable with the projection 12 in order to form limiting means for restricting the travel of the stay rod 22 and consequently the wing 16. This construction prevents the wing 16 from falling downward to a degree which is undesirable in order that the proper dihedral may be maintained.

A rod (see Figure 4) 38 is provided with bifurcations 40 at one end thereof and a sleeve-type universal joint generally indicated at 42 at the opposite end thereof. The said bifurcations 40 are attached to a plate 41 which is rigidly secured to the said projection 12. By this means it is quite apparent that the rod 38 is pivotally associated with the projection 12. Also, the end 44 of the said rod 38 clampingly engages the projection 12 for preventing undesired pivotal movement of the wing 16. The said universal joint 42 is associated with the wing 16 through the medium of a conventional pivot pin 46. The entire arm 38 and its associated mechanism is received completely within a recess 48 formed on the under surface of the wing 16.

Also supplied on the under surface of the said wing 16 is a pair of spaced hook members 50 and 52 respectively for a purpose to be described subsequently.

A central aperture 54 is supplied longitudinally of the wing 16 and has an enlargement 56 at one end thereof. A latch assembly is provided in the enlargement 56 and includes a tongue 58 which is backed by means of a spring 60 or other suitable resilient biasing means. A cable 62, rod or the like is supplied in the bore 54 and attaches at one end to the latch plate 58. The opposite end of the said cable 62 may have a ring 64 or other suitable grasping means secured thereto. However, the ring is in such a position as to be accessible from the wing tip.

A latch keeper, preferably in the form of an appropriately configured recess 66 is supplied in the extension 12 for accommodation of the latch plate 58. It is readily appreciated from an inspection of Figure 5 that the spring 60 normally biases the latch plate 58 within the recess 66 to maintain the wing 16 in the closed or latched position.

Figure 9:
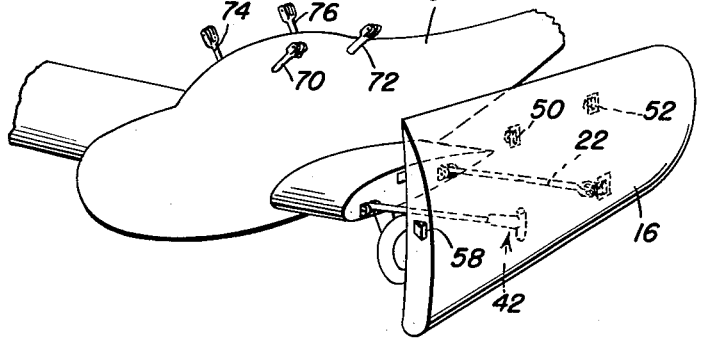
Figure 9 is a perspective view showing a second stage in the operation of the invention while folding.

Referring to Figure 9 it will be seen that a plurality of brackets or posts are provided on the fuselage. These posts are actually two pairs, each of the posts forming a pair 70, 72 and 74, 76 are at opposite sides of the fuselage and one pair of posts is relatively shorter than the other pair. By this means the wings 16 and 18 may be folded over the top of each other as is seen in this figure.

In operation the pin 26 is removed from its position by being slid in the recess 77 and the extensions 44 and 34 prevent either of the wings from dipping or falling. The operator then walks to the wing tip and pulls the ring 64 which releases the latch assembly. Then, the trailing edge of the wing is rotated upward until the wing is in substantially a vertical position (see Figure 8).

Figure 10:
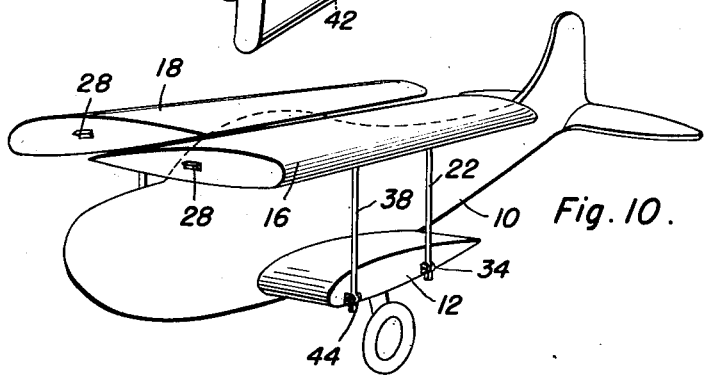
Figure 10 is a perspective view of the invention illustrating the wings in the folded position.
Figure 11:
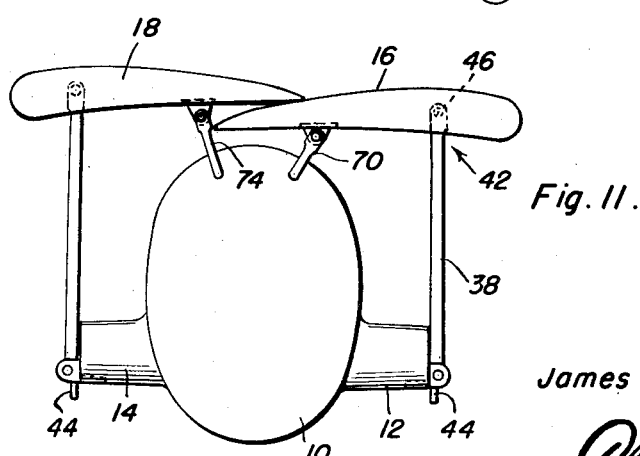
Figure 11 is a front view of the invention shown in Figure 10, the wheel assembly or landing gear being removed.

The wing tip is then swung on the pin 46 until it is substantially parallel to the axis of the fuselage 10. The next step is to replace the pin 26 fastening the rod 22 to the wing and then raise the wing to the position shown in Figure 10, using the brackets 50 and 52 respectively which attach in the bifurcated end of the small posts 70, 72 to hold the wing as shown in Figure 10. Conventional pins or the like may be used in this connection. The small posts 74 and 76 are employed in holding the other wing section after it has been similarly operated.

Having described the invention, what is claimed as new is:

1. An aircraft including a fuselage having attached projections, each of said projections having a wing disposed in a first position and means for hingedly and swivelly attaching the wing thereto, said means for one wing and projection including a rod pivoted at one end to the projection, a universal joint connecting the opposite end of the rod and the wing, and clamping means spaced from the universal joint secured on said wing and on the fuselage to releasably hold the wing in a second position, a latch in said wing, a latch keeper in said projection, said latch being removably disposed in said keeper to retain the wing in the first position, and means at the wing tip for actuating said latch.

2. An aircraft including a fuselage having attached projections, each of said projections having a wing disposed in a first position with respect to the fuselage and means for hingedly and swivelly attaching the wing thereto, said means for one wing and projection including a rod pivoted at one end to the projection, a universal joint connecting the opposite end of the rod and the wing, clamping means spaced from the universal joint and secured on said wing and on the fuselage to releasably hold the wing in a second position, a stay rod pivoted to said projection, and means for detachably securing said stay rod to said wing.

3. An aircraft including a fuselage having attached projections, each of said projections having a wing and means for hingedly and swivelly attaching the wings to the projections, said means including rods pivoted to the projections, a universal joint connecting each rod and wing, and clamping means spaced from the universal joint secured to said wings and to the fuselage, and said clamping means including spaced pairs of posts of unequal length secured to the fuselage for accommodation of each wing in spaced relation relative to each other on the fuselage.

4. An aircraft including a fuselage having attached projections, each of said projections having a wing and means for hingedly and swivelly attaching the wings to the projections, said means including rods pivoted to the projections, a universal joint connecting each rod and wing, and clamping means spaced from the universal joint secured to said wings and to the fuselage, said clamping means including spaced pairs of posts of unequal length secured to the fuselage for accommodation of each wing in spaced relation relative to each other on the fuselage, a stay rod pivoted to each of said projections, and means for detachably securing said stay rod to said wing.

5. The combination of claim 4 and recesses in each of said wings for accommodation of said stay rod and said rod.

6. The combination of claim 5 and means forming stops on said rods limiting the pivotal movement of said rods and said stay rod by abutting said projections.

7. The combination of claim 4 and a latch and a latch keeper operatively connected with each wing and each projection, together with means for operating each latch carried by the wings, the latches and latch keepers being employed to releasably clamp the wings to the projections in a predetermined position with respect to the projections.

JAMES WISMER HOLLAND.

REFERENCES CITED

The following references are of record in the file of this patent:

UNITED STATES PATENTS

| Number | Name | Date |
|---|---|---|
| 1,652,618 | Fairey | Dec. 13, 1927 |
| 1,723,962 | Weymouth | Aug. 6, 1929 |
| 1,757,109 | Boyd | May 6, 1930 |
| 1,793,056 | Carns | Feb. 17, 1931 |
| 1,855,012 | Dill | Apr. 19, 1932 |
| 2,434,068 | Geisse | Jan. 6, 1948 |

FOREIGN PATENTS

| Number | Country | Date |
|---|---|---|
| 239,971 | Great Britain | Sept. 24, 1925 |